US 8,539,557 B1

(12) United States Patent
Buckner et al.

(10) Patent No.: US 8,539,557 B1
(45) Date of Patent: Sep. 17, 2013

(54) SYSTEM AND METHOD FOR CONTROLLING ACCESS TO A PRIVILEGED PERMISSION LEVEL OF A SERVER COMPUTER

(75) Inventors: Lowell Adrian Buckner, Tavares, FL (US); Anthony D. Chen, Orlando, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 159 days.

(21) Appl. No.: 13/206,505

(22) Filed: Aug. 10, 2011

(51) Int. Cl.
 *H04L 29/06* (2006.01)
(52) U.S. Cl.
 USPC .................................................. 726/4
(58) Field of Classification Search
 None
 See application file for complete search history.

(56) References Cited

U.S. PATENT DOCUMENTS

2009/0007256 A1* 1/2009 Raymond et al. ............... 726/19
2011/0296001 A1* 12/2011 Ramstrom .................... 709/224

\* cited by examiner

*Primary Examiner* — David Pearson (57) ABSTRACT

A system for controlling access to a server computer comprising a server computer with a memory; an application residing in the memory of the server computer that, when executed by the computer, provides a first user with access to a primary-level session of the server computer, based on a first access key; provides the first user with a root-level session of the server computer, based on a second access key; prevents a second user from accessing the root from the primary level, while the root-level session of the first user is active; provides the second user with real-time observation of the actions taking place in the session of the first user; permits the first user and the second user to communicate with one another in real-time, during the root-level session; and logs the activity of root-level session.

19 Claims, 3 Drawing Sheets

SYSTEM AND METHOD FOR CONTROLLING ACCESS TO A PRIVILEGED PERMISSION LEVEL OF A SERVER COMPUTER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A server computer may be supported by multiple system administrators (sysadmins). More than one of the sysadmins may be provided access to the system level or a root account on the server computer, in order to perform maintenance and/or to troubleshoot the server computer. Sysadmins may share the same login ID's and/or passwords to access the root of the server computer. Sysadm ins of the server computer may not all be located in the same place.

SUMMARY

In an embodiment, a system for controlling access to an account of a server computer is disclosed. The system comprises a server computer with a memory; an application residing in a memory of the server computer that, when executed by the computer, provides a first user with access to a primary-level session of the server computer, based on a first access key; provides the first user with a root-level session of the server computer, based on a second access key; prevents a second user from accessing the root from the primary level, while the root-level session of the first user is active; provides the second user with real-time observation of the actions taking place in the session of the first user; permits the first user and the second user to communicate with one another in real-time, during the root-level session; and logs the activity of root-level session.

In an embodiment, a system for controlling access to a privileged permission level of a server computer is disclosed. The system comprises a server computer with a memory and an application residing in the memory of the server computer. When executed by the server computer, the application provides a first user with access to an administrator permission level of the server computer based on a first login action, wherein the administrator permission level provides access to functions not available in a standard user permission level. The application further provides the first user with access to the privileged permission level of the server computer based on taking a second login action from within the administrator permission level, wherein the privileged permission level of the server is different from a root level of the server, wherein the commands entered by users having privileged permission level access are logged to a secure log.

In an embodiment, a method of controlling access to a root account of a server computer is disclosed. The method comprises accessing, by a first user, a primary-level session of the server computer, based on a first primary-level access key; accessing, by the first user, a root-level session of the server computer, based on a root-level access key; preventing a second user from accessing the root of the server computer while the root-level session of the first user is active; providing the second user with real-time observation of the root-level session of the first user; permitting real-time communication between the first user and the second user; generating a secure, auditable log of the root-level session; and storing the log in a secure file.

In an embodiment, a system for controlling access to a root account of a server computer is disclosed. The system comprises a server computer with a memory; an application residing in the memory of the server computer that, when executed by the server computer, provides a first user with access to an administrator-level session of the server computer, based on a first action; and provides the first user with access to a root-level session of the server computer, based on taking a second action from within the administrator-level session.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Herein, the term "system administrator" or "sysadmin" may be used to describe one who is tasked with operating and/or maintaining a computer system such as a server computer or the like. These terms should be considered similar to and interchangeable with terms of art such as network administrator, database administrator, security administrator, and the like. In addition, it should be understood that the term "high-level user" is used to indicate a user that is granted access privileges that surpass those of one who would be described by the term "low-level user". By way of example, a low-level user of a computer system may be a common user of the system that may access files of the computer system or run applications on a computer system or such, wherein a high-level user may actually work on the computer system and be granted access to perform actions such as adding, deleting, or otherwise modifying portions of the computer system and/or software, hardware, and/or firmware related thereto. As such, a sysadmin, as described above, would be considered a high-level user.

In addition, the terms "root", "root user", "root account", "root user on the server", and "root level" are used to denote a level of access to or privilege for using the computer system, such as a server computer system, at which modifications/alterations of the software and/or firmware of the computer system may be performed. As such, it may be desirable to restrict access to this privilege level of the computer system. In some contexts the root user may be referred to as the superuser and/or the root account may be referred to as the superuser account.

In an embodiment, systems and a method of controlling and monitoring new modes of access to a network server system are disclosed. The systems and method provide a way of controlling and/or limiting access to certain levels (e.g. a root) of a server computer system by a two-step process, via a separate application and/or a layer running on the server computer system. The application may also provide for monitoring the sessions of those who gain access to the root via this pathway, and may further provide an audit trail so that, should a problem occur during the session, the sysadmin or sysadmins may review the log to determine the source of the problem and correct it. The audit trail may also serve to facilitate some certifications such as ISO, CE, TS, and/or other certifications and/or business pursuits.

In another embodiment, the systems and method allow the first sysadmin who gains access to the root to restrict access to the root to certain others, while the first sysadmin is logged therein. This may prevent a situation wherein more than one sysadmin is attempting to troubleshoot and/or repair a damaged system at the root, at the same time. Having two sysadmins logged into the root at the same time could lead to a situation wherein one is changing a portion of the system at the same time that another is changing the same or a different portion of the system, which could lead to additional problems or damage.

In yet another embodiment, the systems and method allows the first sysadmin to log in to the root account and block access to other sysadmins, but may permit other sysadmins to view the actions of the sysadmin that is working in the root account of the server. This viewing may be in real-time, while the first sysadmin is logged in to the root account, and may permit viewing of the actions of the first sysadmin by the other sysadmins, as the first sysadmin is conducting actions/operations in the root account. In an embodiment, in addition to being able to view the actions of the first sysadmin, other sysadmins may be provided with a means of communicating with the first sysadmin, in order to preempt and/or prevent the first sysadmin from doing something that might lead to an undesirable outcome. This may permit multiple sysadmins to, in a sense, look over the shoulder of the first sysadmin to provide an additional "sets of eyes" to help troubleshoot or direct the repair of the server computer. This may facilitate efficient troubleshooting of the server computer, and may further provide a way for senior sysadmins to train junior sysadmins by watching them as they work on the root account and catching them before they make a mistake, or otherwise guide their actions.

In still another embodiment, an administrative layer or level may be used to control access to the root account and/or the privileges available to the root user. In addition or alternatively, activity in the root account and/or of the root user may be monitored via this administrative layer. This higher level of controlling and/or monitoring root access may be accomplished by keeping an ultimate root password or passwords highly restricted, which may, in effect, further restrict access to the root user privileges.

To use other words to more clearly distinguish from terms that may be in use for existing systems that do not provide the functionality disclosed in the present disclosure, a user may login with an administrator permission level by presenting administrator level login tokens, for example a userid and password that are configured for such administrator permission level access. When logged in at this administrator permission level, the subject user can elevate to a privileged permission level by presenting privileged level login tokens, for example a userid and password that are configured for such privileged permission level access. In an embodiment, the system restricts access to the privileged permission level to a single user at one time. In an embodiment, the system logs the actions of a user logged in at the privileged permission level to a secure data store. In an embodiment, the user logged in at the privileged permission level can designed a selected user logged in at the administrator permission level for echoing the keystrokes of the privileged permission level user to a monitoring window or application presented to the selected user logged in at the administrator permission level.

By way of example, a server computer for a business (e.g. ACME Corporation) may be located in the home offices of the business, such as in Chicago, Ill. ACME may have multiple locations throughout the country, such as offices in Los Angeles, New York, and Dallas. ACME may, however, have a centralized server computer for the entire company, or at least for multiple locations to share. For example, ACME's server may be located at the home office in Chicago, and may be utilized by any/all of the other offices of ACME in other cities. It may be that the central server computer is the only server used by all locations. As such, numerous employees of ACME may log into the user level of the server computer to access programs, applications, files, and such, in the normal course of conducting business. Each of these multiple locations may have their own sysadmins to assist in the upkeep and maintenance of local computers and/or terminals that access the server computer. In addition to these responsibilities, more than one of the sysadmins may have access rights to the root of the server computer, and may be trained to work therein, as needed. As those of ordinary skill in the art would realize, from time to time the server computer may require maintenance, such as upgrading programs, backing up files, adding new users, configuring daemon processes, and/or other such operations. Since more than one sysadmin may be trained to work on the server computer, any one or more of the sysadmins may be assigned to perform certain tasks at the root of the server computer, at any given time.

For example, a sysadmin A may be the sysadmin designated to perform a system upgrade to the server computer. Using the systems and method of the disclosure, sysadmin A may log into the user level of the server computer using a public access key (e.g. a login ID and/or password, and/or combination thereof). In an embodiment, a public and private key may be stored on an administrator's local workstation. When sysadmin A sends the public key that he/she would like to use, and the public key has been validated by the server and the server notes which user is utilizing it, the server may further encrypt information using the public key and return the encrypted information to sysadmin A. Sysadmin A may then decrypt the subject information using the private key. Once logged into the user level, sysadmin A may then log into the root account and/or to the root privilege level using another access key, in this case, a private access key, which may be different from the public access key, but may similarly be a login ID and/or password, or combination thereof. Through methods that are well known to those of ordinary skill in the art, the server computer system may disable access to the server computer to user level (e.g. low-level) users, during the repair/maintenance procedure. In addition, access to the root account may be blocked while the system upgrade is underway; in order to prevent anyone from interfering with or interrupting the upgrade while it is taking place. In an embodiment any/all of the keys, whether public or private may restrict access to some layers and/or levels, depending on the user that is using and/or accessing the keys.

A sysadmin B may be aware that a system upgrade is underway and may want to monitor the upgrade to oversee the work of sysadmin A, who may be newer or less experienced than sysadmin B. Sysadmin B may therefore want to coach and/or advise sysadmin A as he/she performs the upgrade. Sysadmin B may therefore log into the user level, and may then also attempt to log into the root of the server computer. As sysadmin A has blocked access to the root, sysadmin B may be presented with an indication that he/she is not permitted to log into the root, as work is currently in progress thereon, and that access to the root is prevented. Sysadmin B may also be informed, for example by the server computer, that sysadmin A is currently logged in to the root of the server computer, and that sysadmin A has blocked access thereto. In addition, at this point, sysadmin B may be presented with the option of observing the root session currently underway without accessing the root level of the server. Sysadmin B may elect to observe the current root-level session that Sysadmin A is in. Sysadmin B may, for example, select an option on his/her computer screen indicating that they would like to monitor the session. In an embodiment, an admin layer and/or level may be a deeper layer than, for example, a user layer and/or level. In addition, monitoring and/or communication may be provided by a layer does not have direct access to root.

The application may then echo or repeat each keystroke that sysadmin A enters, as they are entered, on the computer screen of sysadmin B. This visibility may provide sysadmin B with the chance to monitor, in a real-time setting, the actions of sysadmin A, and may give sysadmin B a means to ensure that sysadmin A does not make any mistakes or otherwise jeopardize the system by making changes that may negatively affect the server computer and/or software or other systems therein. In an embodiment, any number of sysadmins may be permitted to log in to observe a session at the root, in order to learn from or direct the actions of whichever other sysadmin may be logged therein at any given time and may similarly be able to communicate to one another, as described above. Alternatively, the server computer may be configured such that the first sysadmin to log in as the root may permit other sysadmins to log in as root concurrently. This may facilitate oversight, similar to the scenario described above, but from within the root, as opposed to in an observation mode.

In another example, a server computer may encounter a problem that leads to a system shutdown or crash, and multiple sysadmins in various locations may be alerted, for example by pager, text, or cell phone message. Each of the sysadmins may then attempt to log in to the server computer to assess, troubleshoot, and/or repair the issues and restore the server computer to service. If, as described above, a first sysadmin logs in ahead of others, even if only by a few seconds, the systems and method of the disclosure may prevent additional sysadmins from logging in, thereby ensuring that more than one sysadmin is not attempting to work on the server computer at the same time.

In an embodiment, the systems and method of the disclosure may further provide interactive communications between any/all sysadmins that may be logged in to the server, especially at the root. Using the example above, when sysadmin A is in the process of upgrading the server computer system, sysadmin B may be able to interactively communicate with sysadmin A, in order to, for example, alert sysadmin A that he/she is about to take an action that might adversely affect the server computer system. For example, while monitoring the actions of sysadmin A, sysadmin B may notice that sysadmin A is about to enter a command or instruction that could corrupt a portion of the root-level system of the server computer. Sysadmin B may be provided, via the application layer, the ability to send a brief text-based message to sysadmin A, in order to preempt sysadmin A's actions. Alternatively, sysadmins may actively communicate in real-time via landline telephone, cell phone, voice-over-internet protocol (VOIP) or other communication medium, telephonic or otherwise.

Alternatively, the system may provide for interactive voice communication over the network connection between sysadmin B and sysadmin A, such that there is an interactive, real-time conversation between sysadmin B and sysadmin A, and/or any other sysadmins that may be logged in to the root of the server computer to, for example, observe and/or oversee the work in progress. In another alternative embodiment, the system may provide an interactive, real-time, on-screen video chat feature that not only permits voice interaction, but also provides each of the relevant sysadmins to see one another on their respective computer screens. In an embodiment, any form of communication system or service may be provided that facilitates sufficient communication between any/all appropriate sysadmins to permit them to communicate with one another while concurrently logged in to the server computer.

In an embodiment, the server computer may be configured and/or arranged to log the actions of a sysadmin during the course of time that the sysadmin is logged in to the root of the server computer. It may be desirable to create a log such that, should a problem arise during or subsequent to a session wherein a sysadmin is logged in to the root of the server computer, the sysadmin or another person may review the log in an attempt to determine the source of the problem. Take for example a situation wherein a sysadmin logs in to the root of a server computer and modifies part of the server computer system. In this example, an application or such on the server computer may detect that a root session has begun and may begin logging the session. The application may record every keystroke that the sysadmin makes, and may store the log in a separate, secure file such that it may create a record of the session. Subsequently, should errors surface or problems occur that indicate that mistakes may have been made during the root-level session, the log file may be reviewed by a sysadmin or by another person who may be able to follow the logged flow of the session and determine the point at which an error was made that has led to the problems currently occurring. In this manner, the session log may serve as something of a "bread-crumb trail" or record that may facilitate determining and repairing a problem or problems that were created during a root session.

In an embodiment, the root-level session log may be stored in a secure location or system, and as such may be used for maintaining records of sessions, which may also be utilized for other reasons, such as auditing purposes. This secure system may be separate from the main system, and the events created in the root-level session, for example commands executed by the root user, are logged to the secure system in real time. Users able to access the main system may not be able to access the secure logging system. Maintaining an auditable record may also facilitate registration and/or certification, such as ISO 9000 certification or other, as some certifying agencies require that records of system maintenance be maintained.

Figure 1:
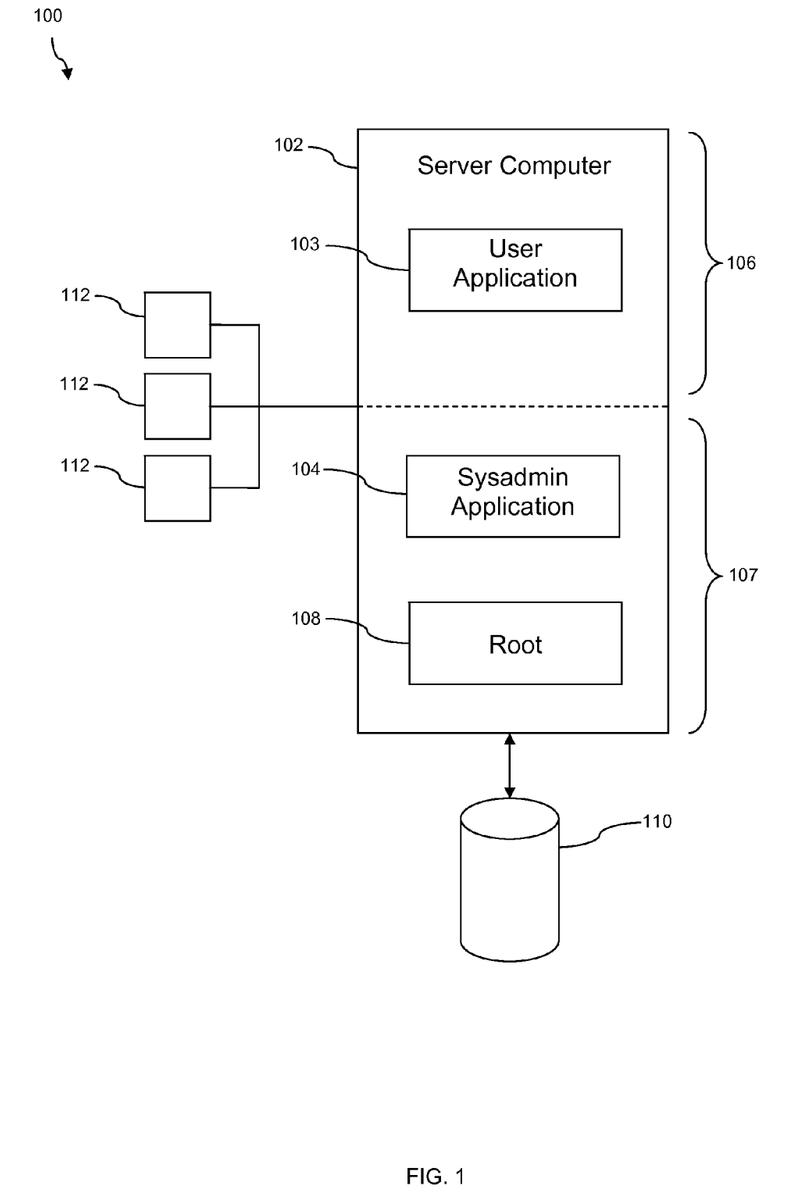
FIG. 1 illustrates a server computer system, according to an embodiment of the disclosure.

Turning now to FIG. 1, a system 100 of an embodiment of the disclosure is illustrated. System 100 comprises a server computer 102, which further comprises at least one sysadmin application 104, a user level 106, a sysadmin level 107, and a storage device 110. In addition, any number of computers 112 may be provided with the ability to access the server computer 102 directly via hardwiring, or indirectly via a public and/or private network, a virtual private network (VPN) or other form of indirect connection. Computers 112 may be operated by any user, whether high-level user or low-level users, but access to certain portions of the server computer 102 may be restricted, as appropriate. User application 103 may be one or more application such as a word processing application, a spreadsheet application, an accounting application, or other such application as may be utilized by a low-level user, and may be executable on the server computer system 102. Sysadmin application 104 may be a login application or daemon, as described herein, and may also be executable on the server computer system 102.

User level 106 may be the level on which most users of the server computer system 102 perform the operations they normally perform in the course of conducting their business or doing their jobs. User level 106 may be the level on which user application 103 resides. User level 106 may be accessible via login credentials such as a login ID and/or password. Login credentials may be provided to users in a company such that each person provided therewith can log on to the server computer 102 to access user application 103, in order to, for example, run spreadsheets, draft documents, and/or run other applications.

Sysadmin level 107 may be a level within server computer 102 to which access is more tightly restricted. Sysadmin level 107 may be the level from which root 108 of server computer 102 is accessible. Root 108 may provide the ability to add, delete, and/or modify software programs that reside on the computer. Root 108 may be where one could modify software by performing software upgrades and/or updates, replacing a brand A application with a brand B application, changing code within an application or operating system such that it performed or behaved differently, or such. As root 108 comprises the ability to make modifications to server computer 102, it may be appropriate to limit access thereto to a person or group of people whom have been trained appropriately to make these types of modifications. For example, someone who has had sufficient training and/or experience to equip them to upgrade software or make operating system modifications to the server computer 102 via root 108 may be granted access to root 108. This access may be by providing them with special permission via, for example, a public/private key scenario as described herein above. This special permission may permit a person to log in to sysadmin level 107, and then in to root 108. In an embodiment, a sysadmin may be provided with login credentials to permit them to log in to the user level 106, such as those provided to regular users of the server computer system 102, and to further be provided with a public/private key system that allows them to then, from the user level, log in to sysadmin level 107, and in to root 108.

In an embodiment, some sysadmins may not have sufficient training and/or experience to work within root 108 without some form of oversight, supervision, and/or accountability. For example, if a sysadmin that has completed the minimum level of training required to work within root 108, and has a minimal amount of experience therewith, it may be advisable to grant them with special, guarded access to root 108, so as to allow them to work therein, but to also be able to monitor them while they are within root 108. In this instance, sysadmin application 104 may thus be employed. For example, a new and/or inexperienced sysadmin may be given a login and/or password code or combination that permits them to log into root 108, via sysadmin application 104. As one of ordinary skill in the art would realize, sysadmin application 104 may be similar to a daemon or an application that operates in a background mode to facilitate login processes or otherwise serves as something of a gatekeeper for systems. However, unlike these other examples, sysadmin application 108 may further provide a logging function that creates a log file of everything that the new sysadmin does while working within root 108. This log file may then be treated as a secure file, and may be stored appropriately, as well as having appropriate access safeguards so as to restrict the ability to open, edit, delete, and/or otherwise manipulate the log file.

By way of example, a new sysadmin (e.g. sysadmin A) may log into sysadmin level 107 and then into root 108 via sysadmin application 104, and may perform whatever tasks they are assigned.

Storage device 110 may be, for example, recordable media such as a hard disc drive, a tape drive, a random access memory (RAM) drive, or such, as one of ordinary skill in the art would know. Storage device 110 may be on a separate system and may have restricted access. Storage device 110 may be configured to store any/all software, files, applications, and such of the server computer system 102. Storage device 110 may also provide storage for the log file described above. As a root 108 session is being logged, information of the session may be transferred to and stored within the storage device 110, whereon the information may be stored within a file such as a secure audit file located on storage device 110. Access to storage device 110, in terms of the ability to add to or remove from storage device 110 files, programs, applications, and such may be limited in a manner similar to user level 106 and sysadmin level 107 access. For example, access to log files on storage device 110 may be provided to sysadmins via a public/private key system, and may be configured so as to prevent low-level users from adding or deleting certain information therefrom, as described above. In an embodiment, the root session log file may be stored in any suitable location, by any appropriate method.

Using other words, the system 100 may be said to provide four distinctly different user permission levels: a standard user permission level, an administrator permission level, a privileged permission level, and a root permission level. The user permission level provides access to standard user functions but does not provide access to functions of root or to functions available through the administrator permission level. The root permission level provides access to all functions with the exception of the new functions provided by the administrator permission level and/or by the privileged permission level.

The administrator permission level provides access to the functions accessible at the standard user permission level as well as access to some more powerful commands. Additionally, the administrator permission level provides access to the login operation to transition to the privileged permission level as well as to initiate a monitoring session to see the streamed input characters of a designated user who is logged in with the privileged permission level—functionalities only available through the administrator permission level. The privileged permission level provides access to all the commands available in the root permission level as well as some additional functionality. The privileged permission level provides access to a command function that prevents others from logging in with the privileged permission level access at the same time. Additionally, the privileged permission level input commands are logged to a secure log, for example in storage device 110. It is noted that there is only one path to access the privileged permission level—the path that requires first logging in to the administrator permission level and then thereafter logging in to the privileged permission level while logged in at the administrator permission level.

Figure 2:
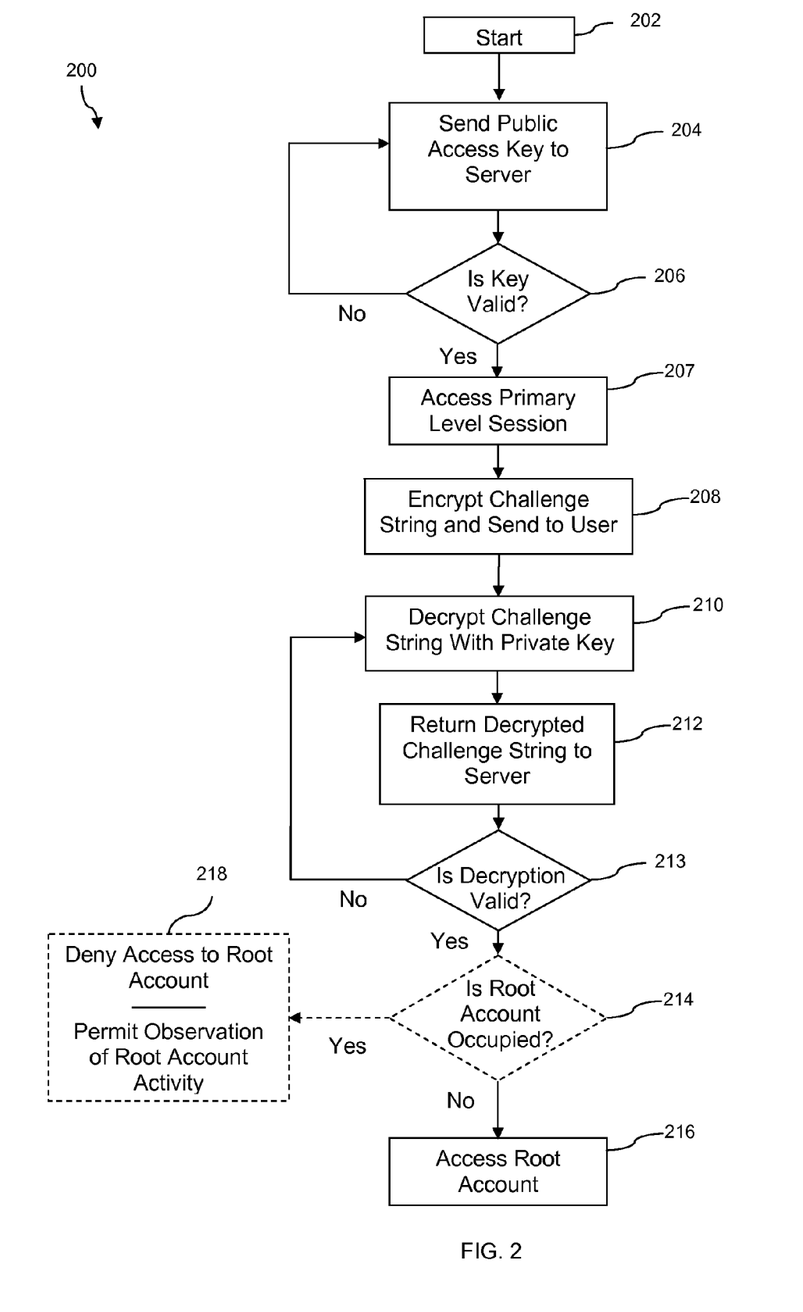
FIG. 2 illustrates a flowchart of a method, according to an embodiment of the disclosure.

FIG. 2 illustrates a method 200 of an embodiment of the disclosure. In method 200, at step 202 the method starts. In step 204, a user of a computer system may send a public access key to a server in order to initiate access to a server computer. In step 206, the public access key is verified by the server. Method 200 may, for example, compare the entered public access key to a list of public access keys that have been verified to be viable, current, and/or meet other criteria that may permit them to be granted access. In step 206, if the public access key is not valid, the user is returned to step 204. At step 207, if the public access key is valid, user may be permitted access to a primary level session. If the user desires access to a root session, the server may, at step 208, encrypt a challenge string and send it to the user.

In step 210, if the user may decrypt the challenge string. In step 212, the user may return the decrypted challenge string the server. At step 213, if the decryption is not valid, the user is returned to step 210. If, at step 213, the decryption is valid, the method advances. At optional step 214 a determination as to whether or not someone is already logged in to the root account is made. If someone is, in fact, already logged in to the root account, access to the current user may be denied such that only the user who logged in before the current user may be in the root account, and the current user may be denied access to the root account. If, however, there is not presently a user logged in to the root account, at step 216, the current user is granted access to the root account. If optional step 214 is present, and if access is denied, the user may be permitted to observe the root activity, as indicated in step 218. In an embodiment, method 200 and or the systems of the disclosure may permit a user logged in to a root-level session to selectively or optionally lock other users out, in order to prevent more than one user from being logged in to the root account at the same time, as described above. For example, once a sysadmin has successfully logged in to the root account of server computer 102 in FIG. 1, the sysadmin may decide to lock out others from logging in to the root account, or optionally may permit others to log in, even as they themselves are logged in. While some embodiments of the disclosure have been directed to only permitting one user (e.g. a sysadmin) to log in to a root account at a time, in the present embodiment, provisions are made to permit more than one user to log in to the root account. As one of ordinary skill in the art may realize, there may be a situation in which more than one sysadmin may be required for some tasks, or it may be advantageous to have more than one sysadmin logged in, simultaneously. For example, in a situation where multiple separate tasks need to be performed, more than one sysadmin may log in and each may perform individual tasks, separately. In an embodiment, any number of sysadmins or high-level users may be permitted to log into the root 108, as may be appropriate for a given situation. In addition, in an alternative embodiment, multiple log files may be created, one for each of multiple sysadmins that may be logged in to the root 108 simultaneously, or one for all of the sysadmins, as may be appropriate for a given situation.

In another embodiment, certain commands that normally require root-level access may be designated as executable at the primary-access level. For example, a sysadmin may be in a primary-level session, and may have a need to execute a root-level command. The sysadmin may only need to execute one command, or a small number of commands, such that going through the process of starting a root-level session does not seem warranted. In this scenario, for example, a set of commands may be provided with a wrapper or portal such that they may selectively be executable by a sysadmin when the sysadmin is logged in to a primary-level session. In this manner, the number and frequency of root-level sessions may be reduced. This may benefit certain business needs, and may also provide the added benefit of not trivializing the risk and/or responsibility associated with a full root-level session, while still permitting some activities that are normally associated strictly with a root-level session.

Figure 3:
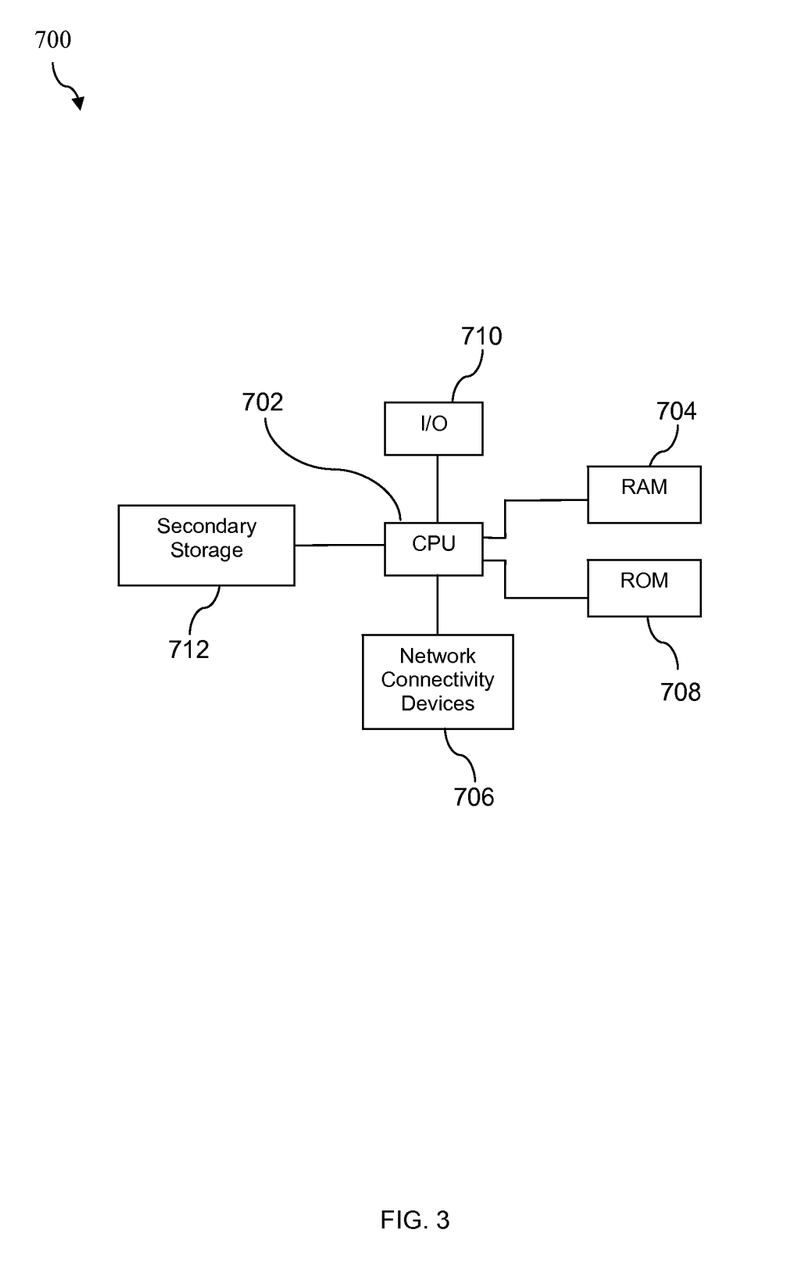
FIG. 3 illustrates a computer system, according to an embodiment of the disclosure.

FIG. 3 illustrates a computer system 700 suitable for implementing one or more embodiments disclosed herein. The computer system 700 includes a processor 702 (which may be referred to as a central processor unit or CPU) that is in communication with memory devices including secondary storage 712, read only memory (ROM) 708, random access memory (RAM) 704, input/output (I/O) devices 710, and network connectivity devices 706. The processor 702 may be implemented as one or more CPU chips.

It is understood that by programming and/or loading executable instructions onto the computer system 700, at least one of the CPU 702, the RAM 704, and the ROM 708 are changed, transforming the computer system 700 in part into a particular machine or apparatus having the novel functionality taught by the present disclosure. It is fundamental to the electrical engineering and software engineering arts that functionality that may be implemented by loading executable software into a computer may be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 712 is typically comprised of one or more disk drives or tape drives and is used for non-volatile storage of data and as an over-flow data storage device if RAM 704 is not large enough to hold all working data. Secondary storage 712 may be used to store programs which are loaded into RAM 704 when such programs are selected for execution. The ROM 708 is used to store instructions and perhaps data which are read during program execution. ROM 708 is a non-volatile memory device which typically has a small memory capacity relative to the larger memory capacity of secondary storage 712. The RAM 704 is used to store volatile data and perhaps to store instructions. Access to both ROM 708 and RAM 704 is typically faster than to secondary storage 712. The secondary storage 712, the RAM 704, and/or the ROM 708 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 706 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 706 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave generated by the network connectivity devices 706 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 712), ROM 708, RAM 704, or the network connectivity devices 706. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 712, for example, hard drives, floppy disks, optical disks, and/or other device, the ROM 708, and/or the RAM 704 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 712, to the ROM 708, to the RAM 704, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 706. The computer program product may comprise instructions that promote the loading and/or copying of data, data structures, files, and/or executable instructions to the secondary storage 712, to the ROM 708, to the RAM 704, and/or to other non-volatile memory and volatile memory of the computer system 700.

In some contexts, a baseband signal and/or a signal embodied in a carrier wave may be referred to as a transitory signal. In some contexts, the secondary storage 712, the ROM 708, and the RAM 704 may be referred to as a non-transitory computer readable medium or a computer readable storage media. A dynamic RAM embodiment of the RAM 704, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for controlling access to a root of a server computer comprising:
   a server computer with a memory;
   an application residing in the memory of the server computer that, when executed by the server computer,
      provides a first user with access to a primary-level session of the server computer, based on a first access key;
      provides the first user with a root-level session of the server computer, based on a second access key;
      prevents a second user from accessing the root from the primary-level session, while the root-level session of the first user is active;
      provides the second user with real-time observation of actions taking place in the root-level session of the first user;
      permits the first user and the second user to communicate with one another in real-time, during the root-level session; and
      logs activity of the root-level session.

2. The system of claim 1, wherein the log is stored in a secure computer-readable file.

3. The system of claim 2, wherein the log is auditable.

4. The system of claim 1, wherein the log comprises keystrokes entered during the root-level session and all communications between the first user and the second user.

5. The system of claim 1, wherein the first access key and the second access key are different.

6. The system of claim 1, wherein selected commands that are generally reserved for execution in the root-level session are executable from within the primary-level session.

7. A system for controlling access to a privileged permission level of a server computer, comprising:
   a server computer with a memory;
   an application residing in the memory of the server computer that, when executed by the server computer,
      based on a first login action, provides a first user with access to an administrator permission level of the server computer, wherein the administrator permission level provides access to functions not available in a standard user permission level; and
      based on taking a second login action from within the administrator permission level, provides the first user with access to the privileged permission level of the server computer, wherein the privileged permission level of the server computer is different from a root level of the server computer, wherein commands entered by users having privileged permission level access are logged to a secure log, and wherein a second user is prevented from entering the privileged permission level while the first user is logged in to the privileged permission level.

8. The system of claim 7, wherein the first login action comprises providing administrator level login tokens provisioned for the first user.

9. The system of claim 8, wherein the administrator level login tokens comprise a first access key.

10. The system of claim 7, wherein the second login action comprises providing privileged level login tokens provisioned for the first user.

11. The system of claim 10, wherein the privileged level login tokens comprise a second access key.

12. The system of claim 7, further comprising permitting the second user to observe a privileged level session of the first user.

13. The system of claim 12, wherein the first user and the second user are provided with communications between each other via the server computer.

14. The system of claim 7, wherein the application runs as a daemon process.

15. A method of controlling access to a root of a server computer comprising:
   accessing, by a first user, a primary-level session of the server computer, based on a first public access key;
   accessing, by the first user, a root-level session of the server computer, based on a root-level access key;
   preventing a second user from accessing the root of the server computer while the root-level session of the first user is active;
   providing the second user with real-time observation of the root-level session of the first user;
   permitting real-time communication between the first user and the second user;
   generating a secure, auditable log of the root-level session; and
   storing the log in a secure file.

16. The method of claim 15, wherein the log contains keystrokes of the root-level session.

17. The method of claim 15, wherein the log is auditable.

18. The method of claim 15, wherein the real-time communication between the first user and the second user is via the server computer.

19. The method of claim 18, wherein the real-time communication is via one or more of voice-over-internet protocol (VOIP), keyboard input, text messaging, and video conferencing.

* * * * *